No. 764,892. PATENTED JULY 12, 1904.
F. JANATA.
AUTOMATIC VENDING MACHINE.
APPLICATION FILED FEB. 23, 1904.
NO MODEL. 5 SHEETS—SHEET 1.

Witnesses:
William P. Bond
Pierson W. Banning

Inventor.
Frank Janata
By Banning & Banning
Attys.

No. 764,892. PATENTED JULY 12, 1904.
F. JANATA.
AUTOMATIC VENDING MACHINE.
APPLICATION FILED FEB. 23, 1904.
NO MODEL. 5 SHEETS—SHEET 3.

Witnesses:
William P. Bond
Pierson W. Banning

Inventor,
Frank Janata
By Banning & Banning
Attys.

No. 764,892. PATENTED JULY 12, 1904.
F. JANATA.
AUTOMATIC VENDING MACHINE.
APPLICATION FILED FEB. 23, 1904.
NO MODEL. 5 SHEETS—SHEET 4.

Witnesses:
William P. Bond
Pierson H. Banning

Inventor:
Frank Janata
By Banning & Banning
Attys.

No. 764,892. PATENTED JULY 12, 1904.
F. JANATA.
AUTOMATIC VENDING MACHINE.
APPLICATION FILED FEB. 23, 1904.
NO MODEL. 5 SHEETS—SHEET 5.

Witnesses:
William P. Bond
Pierson W. Banning

Inventor.
Frank Janata
By Bauersfeld & Banning
Attys.

No. 764,892. Patented July 12, 1904.

UNITED STATES PATENT OFFICE.

FRANK JANATA, OF CHICAGO, ILLINOIS.

AUTOMATIC VENDING-MACHINE.

SPECIFICATION forming part of Letters Patent No. 764,892, dated July 12, 1904.

Application filed February 23, 1904. Serial No. 194,937. (No model.)

*To all whom it may concern:*

Be it known that I, FRANK JANATA, a citizen of the United States, residing at Chicago, in the county of Cook and State of Illinois, have invented certain new and useful Improvements in Automatic Vending-Machines, of which the following is a specification.

The vending-machine of the present invention is designed more particularly for selling cigars, but can be used for the sale of small packages of a nature to self-deposit themselves one at a time into a revoluble carrier, from which carrier each package can be discharged into a suitable receiver open to the purchaser of the article.

The objects of the invention are to improve the actuating mechanism by which the carrier is revolved, so as to enable different-priced articles to be sold by the deposit of the required number of coins—as, for instance, nickels—to cover the price of the article; to enable a deposit to be made varying as to the number of coins, so that the last coin deposited will trip the actuating mechanism and revolve the goods or article carrier; to furnish a fixed stop and an adjustable stop for enabling a varying number of coins to be deposited for the last coin deposited to actuate the mechanism for revolving the goods or article carrier and with the initial start of the actuating mechanism for the entire number of deposited coins dropped from the coin-chute; to furnish a clock mechanism the fan of which controls the distance of travel for the goods or article carrier; to furnish an automatic stop for controlling the distance traveled by the goods or article carrier; to enable the rotatable carrier to be carried forward a distance to deposit a single article or a distance to deposit two articles on the deposit of a single coin; to enable the revoluble carrier to turn for one or more receptacles to each discharge an article; to enable the coin-chute to be opened for depositing the coin or coins coincident with the withdrawal of the lock for the revoluble carrier and the initial advance of the carrier and with the delivery of an article have the parts automatically return to normal position; to provide a guard against releasing the lock and have the mechanism continue to run after the coin has been dropped, and to improve generally the devices and their arrangement which enter into the construction and operation of the actuating mechanism and parts of the vending-machine as a whole.

The invention consists in the features of construction and combinations of parts hereinafter described and claimed.

The vending mechanism as a whole is inclosed within a suitable casing. The casing shown consists of a base 1, having extending up from each corner a post or standard 2 and having between the two front corner-standards a solid metal or other plate 3, with a ledge 4 to support the remaining portion of the front of the casing. The front wall 5 of the casing and the side and rear walls can be made of glass, if so desired, so as to enable purchasers to observe the mechanism, and the rear wall and side walls can be secured in place between the corner-post 2 in any suitable manner. The casing is closed by a cover-plate 6, which also can be of glass, but preferably is of metal, and this cover-plate is secured to the top of the corner-post by suitable binding-screws 7 or in any other well-known manner. A drop-tube 8 for the coin is attached to the top of a cover-plate and has a depending portion 9 extending below the cap or cover-plate and so arranged as to enter a dropped coin into the coin-chute 10, which chute is set with a slightly-downward inclination to insure the travel of the coin for deposit into the vertical chute. The coin-chute 10 has on one side an opening 11, through which coins of a less diameter than the required coin to actuate the machine will drop, and to assist the throwing out of small coins the interior of the chute 10 has deflecting-rib 12, which tips the small coin so that it will be deposited into a receiver 13, attached to the chute 10 and be thereby prevented from operating the actuating mechanism. The coin-chute 10 has attached thereto a magnet 14 by means of a pivot 15 passing through one arm of the magnet, and the magnet is adjustable on its pivot and when adjusted is held in position by a set-screw 16 and a washer 17 or in any other suitable manner.

The delivery end of the inclined chute 10 opens into the upper end of a vertical chute, and this vertical chute, as shown, consists of a plate 18, having its side edges turned to form side walls 19, to which side walls are secured a plate 20, leaving a passage through the chute between the walls of sufficient dimensions to allow a coin of a predetermined denomination to pass downward. A plate 21 is pivotally mounted on the plate 18, and, as shown, the pivotal mounting of the plate 21 is by a plate 22, attached to the upper end of the plate 21 by rivets 22$^a$ or otherwise, which plate 22 has ears or eyes 23 to enter openings between ears 24 on a plate 25, attached to the plate 18 by rivets 25$^a$ or otherwise, with a pivot-pin 26 passing through the ears 23 and 24, so that the lower end of the plate 21 can swing from and toward the face of the plate 18 on the pivot-pin.

Figures 9, 10, 11, 12, 13, 14, 15:
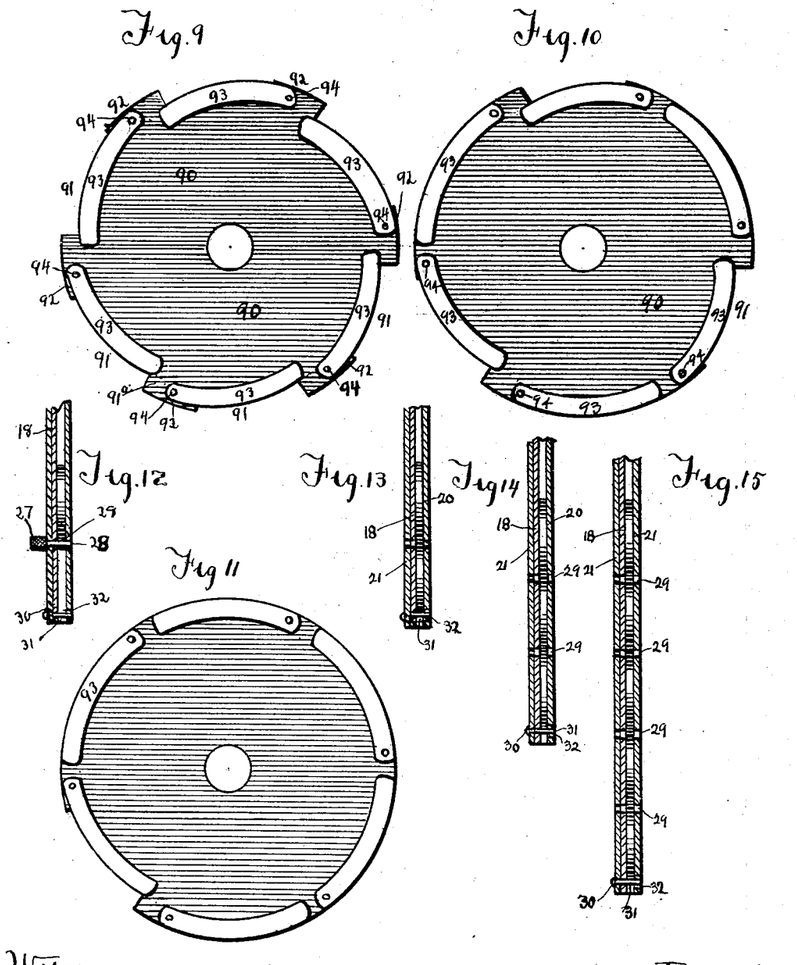
Fig. 9, a side or face view of the stop-disk controlling the distance traveled by the revoluble carrier and showing the bridges for the recesses in position to drop a single article at each deposit of a coin.
Fig. 10, a similar view to Fig. 9, showing the bridges for the recesses arranged to drop two articles with the deposit of one coin.
Fig. 11, a similar view to Fig. 9, showing the bridges for the recesses in position to drop six articles with the deposit of one coin.
Fig. 12, a detail in section of the lower end of the coin-chute with a coin therein for operating the actuating mechanism from the deposit of a single coin.
Fig. 13, a detail in section of the lower end of the coin-chute, showing one of the stop-pins withdrawn for actuating the mechanism with the deposit of three coins.
Fig. 14, a detail in section of the lower end of a coin-chute constructed to operate the actuating mechanism with the deposit of three coins.
Fig. 15, a detail in section of the lower end of a coin-chute constructed to operate the actuating mechanism with the deposit of five coins, Fig. 13 showing two coins in position, Fig. 14 showing three coins in position, and Fig. 15 showing five coins in position.
Figure 16:
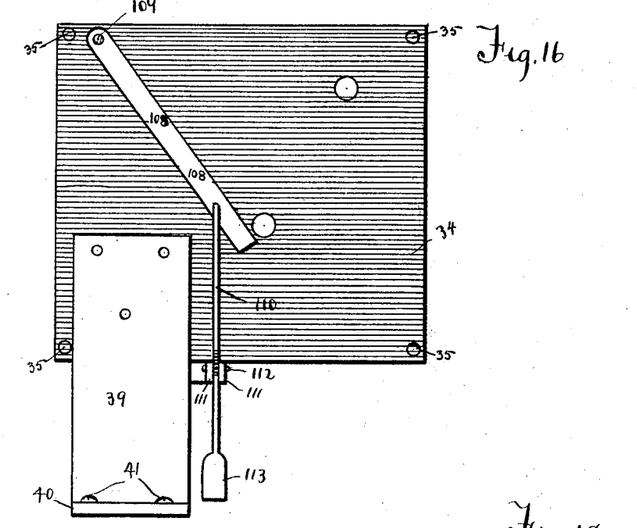
Fig. 16, a detail showing the rear plate of the frame of the clock mechanism with the return-spring for the shaft of the fan and the weighted arm for holding the spring down in case of the machine being tipped.
Figures 17, 18, 19:
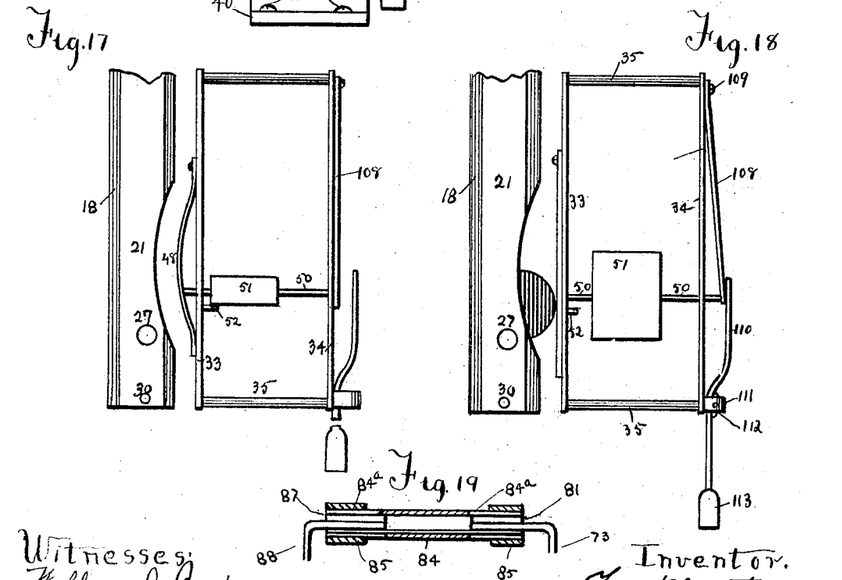
Fig. 17, a detail showing the lower end of the coin-chute, the spring for releasing the fan of the clock mechanism, the frame of the clock mechanism, the fan and its shaft, the return-spring for the shaft of the fan, and the stop or guard arm with its weight to hold the return-spring of the fan-shaft receded in case the machine is tipped, the various gears and the power-spring not being shown, such parts being shown fully in Figs. 2, 3, 4, 6, and 7.
Fig. 18, a similar view to Fig. 17, showing, however, a deposited coin in position to force the fan of the clock mechanism out of its locked position.
Fig. 19, a detail, partly in section, showing the means for securing the trip rods or arms by which the stop-disk of the revoluble carrier releases the coins.

The plate 21 in the construction shown in Figs. 2, 3, 4, 5, 6, 7, and 8 has at its lower end a head or finger-piece 27, extending out from which is a stem 28, which can be threaded into or be otherwise entered into the plate 21, so as to be removable, and the outer end of the stem 28 when the plate 21 is flat against the plate 18 projects into a hole 29, provided therefor in the plate 20, as shown in Fig. 12. The extreme lower end of the plate 21 in the construction and arrangement shown in Figs. 2 to 8, both inclusive, carries a head 30, projecting from which is a stem 31, which may be permanently entered into the plate 21 or be removably entered thereinto, as may be desired, and this stem or pin 31 when the plate 21 is against the face of the plate 18 projects into a hole 32, formed therefor in the plate 20. The construction of the lower end of the vertical coin-chute (shown in Figs. 12 and 13) is adapted for operating the actuating mechanism for the carrier with a single coin or with two coins deposited one after the other. A single coin is used with the stop-pin or stem 28 in position, as shown in Fig. 12, and two coins are necessary when the stop-pin or stem 28 is removed, as shown in Fig. 13. The single coin is stopped so as to start the clock mechanism by resting on the pin or stem 28, and for two coins the first coin rests on the pin or stem 31, and the second coin rests on the first coin, as shown in Fig. 13. The tube shown in Fig. 14 is adapted for one coin, two coins, or three coins, and the tube shown in Fig. 15 is adapted from one coin up to five coins, and with either construction for one coin the stop-pin or stem 28 is to be inserted in the upper hole of the plate 21, so as to enter the upper hole of the plate 18 and stop the first coin dropped in position to release the clock mechanism, and for two coins with the tube of Fig. 14 the stop-pin 28 is to be entered into the intermediate hole of the plate 21, so as to enter the intermediate hole of the plate 18 and bring the upper or second coin dropped into position to start the clock mechanism, and for three coins the stop or pin 28 is to be entirely removed, the first coin resting on the stop-pin or stem 31 and the second and third coins lying thereabove, as shown in Fig. 14. The chute (shown in Fig. 14) for a single coin has the stop-pin 28 entered in the upper hole, for two coins the stop-pin or stem 28 is entered in the second hole from the top, for three coins the stop-pin or stem 28 is entered in the third hole from the top, for four coins the stop-pin or stem 28 is entered into the fourth hole from the top, and for five coins the stop-pin or stem 28 is entirely removed for the first coin dropped to rest on the stop-pin or stem 31 and the other coins to lie thereabove successively, as shown in Fig. 15.

Figure 1:
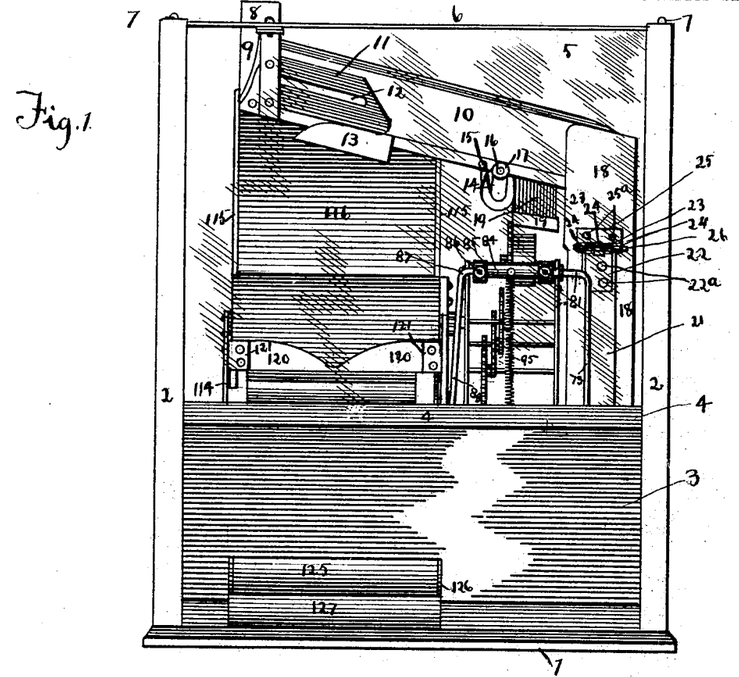
Figure 1 is a front elevation of the machine with its inclosing casing.
Figure 2:
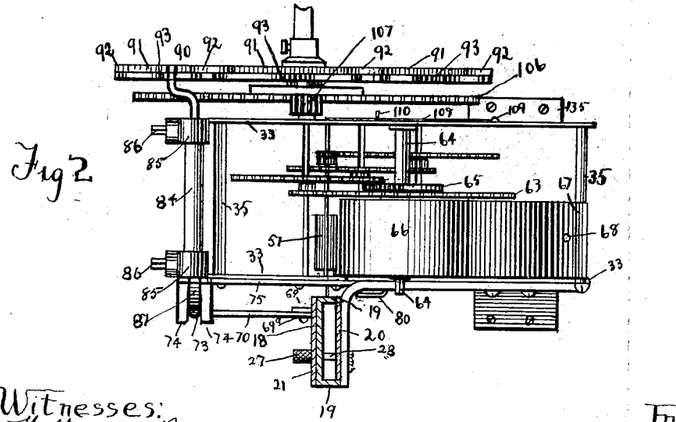
Fig. 2, a detail, being a top or plan view, partly in section, of the actuating mechanism for revolving the carrier.

The clockwork for furnishing the power to revolve the carrier can be of any usual construction, and, as shown, is mounted in a side plate 33 and a side plate 34, connected at the corners by cross-rods 35, as usual, and, as shown, extending down from the plate 33 is a support 36, having a turned end 37, through which bolts 38 pass for securing the support to the base-plate 1, and extending down from the side plate 34 is a support 39, having a turned end 40 for the passage of bolts or screws 41, by which a support is secured to the base-plate 1. The vertical chute is supported in position by a plate 42, attached by screws 43 or otherwise to the side plate 33 and having a turned end 44 for the passage of screws 45, the stems of which screws enter the plate 20 and hold the vertical chute in position, as shown in Figs. 2, 3, and 6.

The inner edge of the vertical chute is cut away so as to leave an opening 46, through which the edge of a deposited coin projects, and, as shown, the inner edge of the movable plate 21 is cut away so as to form a curved edge 47 in line with the curved edge of the opening in the vertical chute. A spring 48 is attached at its upper end by a screw 49 or otherwise to the side plate 33, and this spring is curved so that normally it lies within the curve of the opening 46 in the vertical coin-chute, as shown in Fig. 5. The lower end of the spring 48 abuts against the end of a shaft 50, on which a fan of a clock-movement is secured, which shaft is mounted in the side plates 33 and 34 of the supporting-frame of the clock-movement, and this fan when in normal position is caught and held by the engagement thereof with a stud or pin 52, projecting out from the inner face of the plate 33, so that when the parts are normal, as shown in Figs. 3, 4, and 5, the fan is held against rotation. The clock-movement can be of any suitable construction. As shown, it consists of a pinion 53, mounted on the shaft 50 and engaging a gear 54, mounted on a shaft 55, on which shaft is a pinion 56, which engages with a gear 57, mounted on a shaft 58, on which shaft is a pinion 59, engaging with a gear 60, mounted on a shaft 61, on which shaft is a pinion 62, engaging with a gear 63 on the winding-arbor 64 for the power-spring, the arbor and the gear having the usual ratchet and pawl 65 for enabling the spring to be wound in the ordinary manner, and the arbor 64 has connected therewith one end of a power-spring 66, the other end of which is formed with a loop 67, entered onto a cross-rod 34 of the frame and held in place by a rivet or screw 68 or otherwise, so as to furnish a fixed attachment for one end of the power-spring to enable the spring to be wound up in order to operate the clock mechanism.

Figures 3, 4, 5, 20:
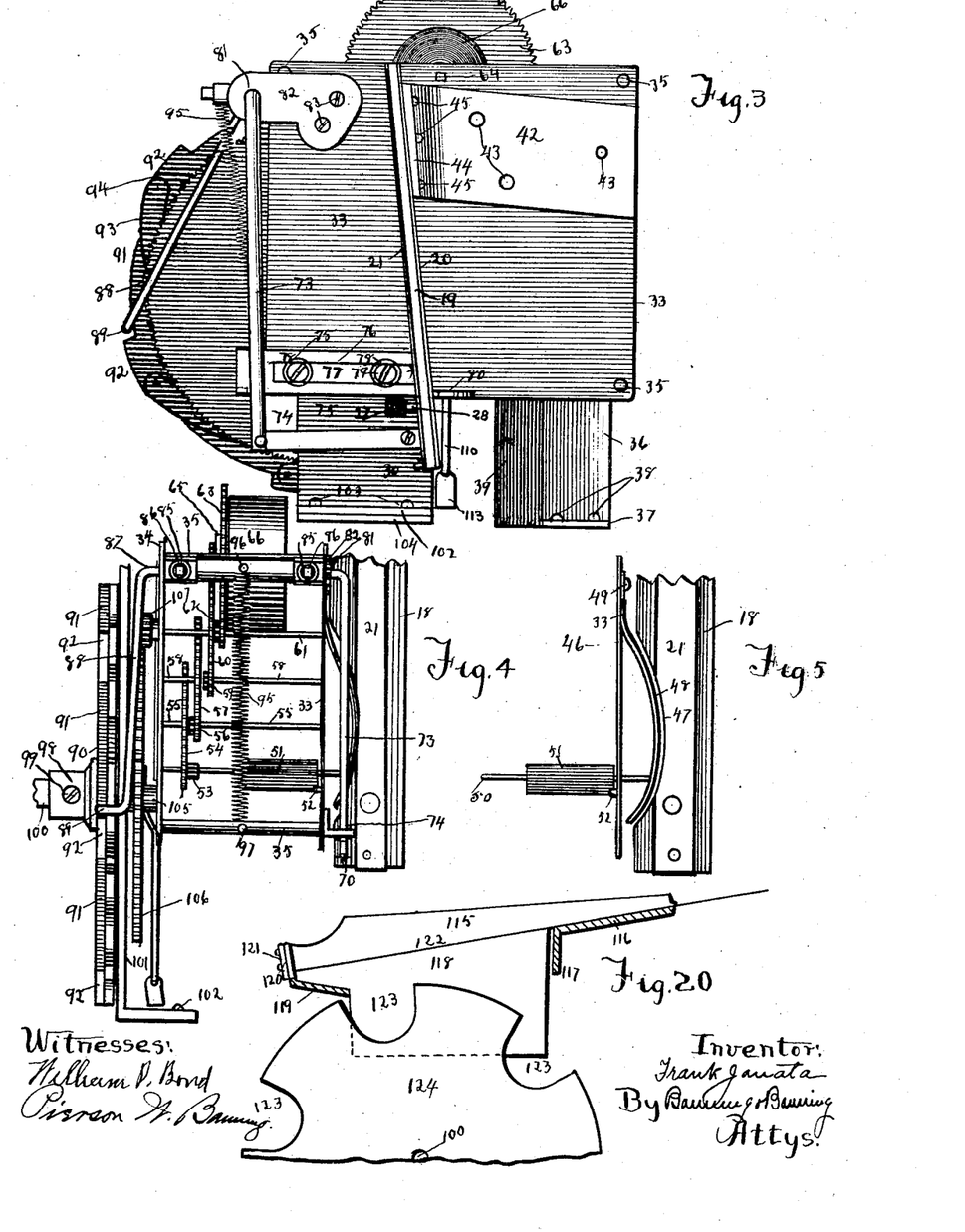
Fig. 3, a side elevation showing the actuating mechanism for revolving the carrier, with the parts in normal position and in condition for the deposit of a coin.
Fig. 4, a front elevation of the actuating mechanism in the position shown in Fig. 3.
Fig. 5, a detail showing the lower end of the coin-chute and the position of the spring and the shaft of the fan of the clock mechanism when the parts are in normal position.
Fig. 20, a detail in section showing a portion of the revoluble carrier and the table supporting the articles to be vended.
Figure 6:
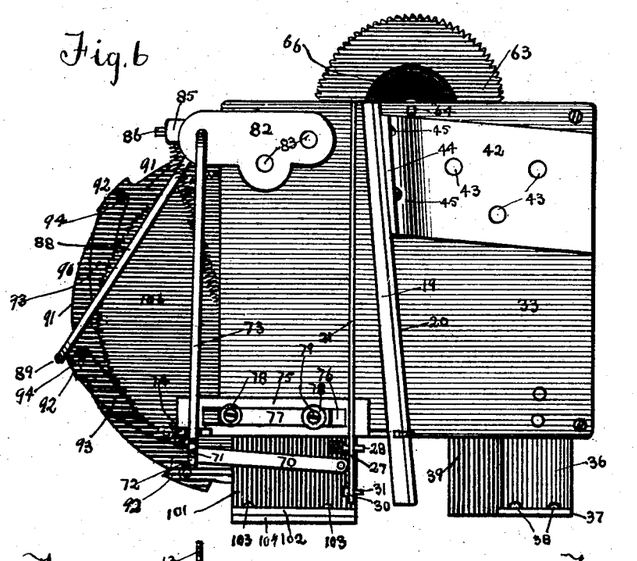
Fig. 6, a similar view to Fig. 5, showing, however, the parts in position for revolving the carrier.
Figures 7, 8, 21:
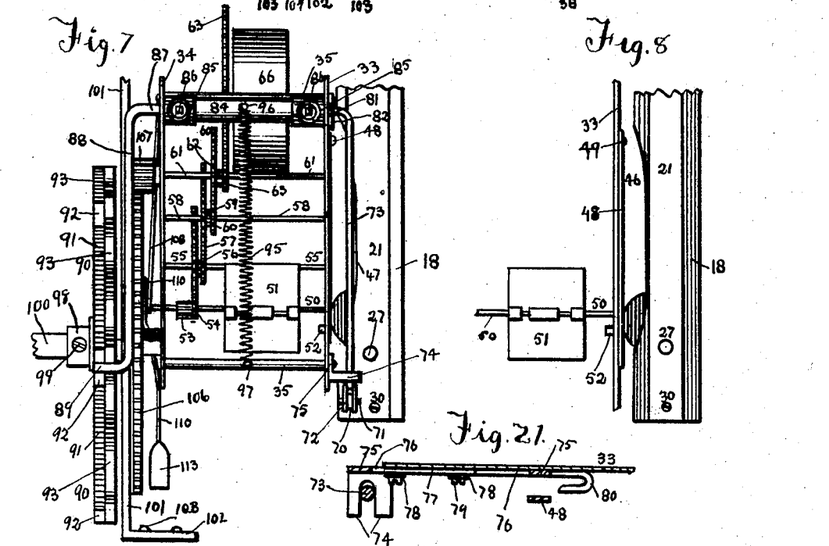
Fig. 7, a front elevation of the parts in the position shown in Fig. 6.
Fig. 8, a detail showing the lower end of the coin-chute with a deposited coin therein projecting edgewise and forcing the fan of the clock mechanism out of engagement for the power-spring of the clock mechanism to act and revolve the carrier.
Fig. 21 a detail, partly in section, showing the slide and the hook at the inner end of the slide for engaging the spring that moves the shaft of the fan and holding the spring in its advanced or operative position.

An ear 69 projects out from the lower end of the plate 21 at its inner side edge in the arrangement shown, and this ear has pivoted thereto by a suitable pin or pivot 69$^a$ one end of a link 70, the outer end of which link is connected by a pin or pivot 71 with a forked end 72 of a rod 73, which rod passes through a slot in an ear 74, extending out from a sliding plate 75, which plate has a slot 76 to receive a guide or support 77 on the outer face of the side plate 33 of the frame, and, as shown, the slide 75 is held in position by washers 78 and set-screws, one of which may be the screw for the lower end cross-rod at the corner of the frame and the other one of which may be a set-screw 79, as shown in Figs. 3 and 6. The slide 75 has a reciprocating movement given thereto from the oscillating movement of the rod 73, and this reciprocating movement of the slide carries a hook 80 out of engagement with the spring 48 when the parts are in normal position, as shown in Figs. 3, 4, and 5, and brings the hook into position to engage the spring when the parts are in the position shown in Figs. 6, 7, and 8, holding the shaft 50 of the fan receded, so that the fan will be disengaged from its stop-pin 52 for a predetermined period of time.

The upper end of the rod 73 is turned at an angle to form an arm 81, which arm passes through a hole therefor in a plate 82, attached by screws 83 or otherwise to the side plate 33 of the frame of the clock or power mechanism. The arm 81 is entered into the end of a rocking head 84 and, as shown, is clamped and held in position by a clasp 85, entered onto the end of the rock-head 84, and a tightening-screw 86, the stem of which passes through the socket of the clasp and forces the head tightly against the entering end of the arm, and for the purpose of insuring a clamping effect the end of the rocking head 84 has a series of slots 84ª, which permits of the necessary contraction with the advance of the tightening-screw. The opposite end of the rocking head 84 is slotted and has entered thereonto a clamp 85 with a tightening-screw 86, and this end of the rocking head 84 has entered thereinto the end of an arm 87, formed by turning the upper end of a rod 88 at an angle, as shown in Fig. 4. The lower end of the rod 88 is turned outwardly and forms a stop 89 to engage with a stop-disk 90, controlling the rotation of the revoluble carrier. The stop-disk 90 has its periphery provided with a series of notches 91 and stops 92, the construction shown having six notches or recesses 91 and six stops 92; but a greater or less number of recesses and stops could be used, the disk shown being intended for delivering six articles for a predetermined number of coins or any number of articles between one and six, as may be desired. The recesses are brought into use or thrown out of use by menas of bridges 93, one bridge for each recess, and each bridge, as shown, has a pivot or pin 94, so that it can be swung out of position, leaving the recess clear, or into position to bridge or close the rest. The stop 89 of the rod 88 can drop into a recess when the bridge of the recess has its free end turned below the periphery of the disk or plate 90, as shown in Figs. 3, 6, and 9, and when the bridges are thus arranged the power or clock mechanism will rotate the stop disk or plate 90 a distance equal to the distance of the uprise of the bridge and its stop 92 for the delivery of a single article with the deposit of a coin of predetermined value. The stop 89 of the rod 88 when a bridge is swung to close the recess will ride over the recess on the bridge and will enter the first open recess, so that the distance traveled by the stop disk or plate will be equal to the distance of two or more recesses, according to the number of recesses that are bridged. The bridging of each alternate recess, as shown in Fig. 10, causes the stop-arm to ride over each alternate recess 91, giving the stop plate or disk a distance of travel equal to that of the space occupied by two recesses and the stop intervening between the recesses, which would with the arrangement in Fig. 10 give three stoppages of the disk or plate 91 with the revolution of the disk or plate. The disk or plate 91 can be given a full revolution without stoppage by raising all of the bridges 93, except one, as shown in Fig. 11, which would make a delivery of six articles with each complete revolution of the disk or plate 91 instead of two articles with the bridges, as in Fig. 10, or one article with the bridges, as in Fig. 9. The stop-rod 88 and the rod 73 are returned to normal position when the stop 89 of the rod 88 enters a recess 91 by a coiled spring 95, one end of which is attached to a pin or stud 96 on the rocking head 84 and the other end of which is attached to a pin or stud 97 on the cross-rod 35 of the power or clock mechanism frame, as shown in Fig. 4.

The stop-disk 90 has a center or hub 98, which is locked by a set screw or bolt 99 to a shaft 100, so that with the release of the stop-disk from the stop 89 the shaft 100 will be revolved a distance for one recess up to six recesses, according to the set of the bridges 93 for the recesses 91 in the stop-disk. The shaft 100 is supported at one end in an upright or standard 101, having a foot or angle piece 102, through which bolts 103 pass, connecting the standard or upright to a cross-plate 104, secured to the base 1 of the casing in the construction shown. The end of the shaft 100 projects beyond the standard or upright 101 and has secured thereto the center or hub 105 of a gear 106, which meshes with a pinion 107 on the end of the shaft 61, so that with the rotation of the shaft from the pinion 62 and gear 63 the pinion 107 will drive the gear 106 and revolve the shaft 100, and with it the disk 91, the distance of the uncovered or bridged spaces of the disk or plate.

The shaft 50, with the fan 51, is returned to normal position after the engaging coin has descended and escaped from the coin-chute by a spring 108, attached by a screw 109 or otherwise to the frame-plate 34, the free end of the spring 108 engaging the end of the shaft 50, so that with the endwise movement of the shaft by the forcing of the spring 48 inwardly the spring 108 at its free end will be carried outwardly and under a tension that will return the shaft and fan to normal position with the dropping of the coin. The free end of the spring 108 is in line with the upper end of a stop-arm 110, pivoted between ears 111 by a pin or pivot 112 and having at its lower end a weight 113, and this stop-arm is for the purpose of forcing the end of the spring 108 inwardly in the event of tipping the machine, so as to make the delivery continuous, as with the tipping of the machine the weight will swing and carry the upper end of the stop-arm 110 against the free end of the spring 108 with sufficient force to move the shaft 50 and the fan 51 back to normal position for the fan to engage with the pin 52 and stop the clockwork or power mechanism.

A companion standard or upright 114 to the standard or upright 101 extends up from the plate 104 and furnishes the other bearing or support for the shaft 100 in the construction shown. Extending rearwardly and upwardly from the standard or upright 101 and the standard or upright 114 is a side plate 115, and between the side plates at their rear ends is a bottom plate 116, the side plates and the bottom plate furnishing a support to receive a box of cigars or receptacle for other articles to be sold. The bottom plate 116 at its front end has a downwardly-extending portion 117, and on each side and forward of the guard 117 is a side plate 118, the forward end of which rests on or is adjacent to an inclined plate or shelf 119, having upwardly-extending flanges or wings 120, which are attached to the side plates 115 by turned ends 121 of the side plates and suitable screws or rivets. An open space 122 is left between the guard-plate 117 and the shelf or plate 119, and below this open space is located the delivery-cylinder for the articles to be sold. The delivery-cylinder has in its periphery a series of pockets 123, corresponding in number to the number of recesses or spaces 91 in the stop disk or plate 90, and the delivery cylinder or roller 124 is fixedly mounted on the shaft 100, so that the receiving-pocket 123 will be successively brought into position to receive each a single article to be sold and delivered. The articles to be sold and delivered pass from the box or receptacle which is open at the point in line with the open space 122, so that the articles will rest on the cylinder or roller for a single article to drop into a pocket 123 and be carried around to a point where it can escape from the pocket for final delivery. The construction shown delivers an article from a pocket 123 onto a shelf or riser 125, inwardly extending from the plate 3, for the article to pass down the shelf and out through an opening 126 in the plate 3 to rest in a trough or receiver 127 accessible to the purchaser.

The operation is as follows: The purchaser drops a coin of the required denomination for use with the machine—as, for instance, a nickel—into the tube 8 for the coin to descend through the inclined chute 10 and enter the vertical chute and descend therein for its edge to project through the opening 46 and engage with the spring 48, forcing the spring inwardly and moving the shaft 50, with the fan 51, inwardly, releasing the fan from the stop-pin 52, which allows the power-spring to operate the train of gear and revolve the shaft 100 with the carrier or delivery cylinder or roller. The stop disk or plate 90, with the bridges 93, arranged as shown in Fig. 9, will allow the carrier or delivery cylinder to revolve the distance of a single recess or space 91 with the dropping of each coin, the pin or stem 28 being in the upper or top hole of the plate 21, so that the dropped coin will rest on this pin with its edge projecting to engage the spring 48 and release the fan. The coin remains in engagement with the spring 48 until the clockwork or actuating mechanism starts, and with the initial start of the actuating mechanism the stop disk or plate is revolved for the bridge-piece of the recess or space in which the stop end 89 of the rod 88 rests to engage the stop end 89 and swings outwardly the rod 88, rocking the head 84 and oscillating the rod 73 for the lower end of the rod through the link 70 to carry the lower end of the plate 21 away from the vertical coin-chute, withdrawing the stop pins or stems 28 and 31, leaving a clear space for the deposited coin to drop from the chute. The power-spring will continue to actuate the driving mechanism and revolve the stop-disk 90 and the carrier or delivery cylinder 124, while the stop end 89 rides up on the bridging-piece and over the projection or stop 92 and with the descent of the stop 89 into the next succeeding recess or space 91, the arm 88 and the arm or rod 73 returned to normal position for the rod 73 through the links 70 to move the plate 21 against the face of the vertical coin-chute for the stop pins or stems 28 and 31 to project across the space of the chute in position to engage the next deposited coin and start the actuating mechanism, which has been stopped by the engagement of the fan 51 with the stop-pin 52 through the return of the shaft 50 by the action of the spring 108 pressing against the end of the shaft. The entering of the stop 89 into a recess or space and the engagement of the fan 51 with its stop-pin 52 sets the actuating mechanism and the parts in position for the deposit of a new coin to again start the mechanism. The rotation of the carrier or delivery cylinder 124 with the deposit of each coin is sufficient to carry a filled space or pocket 123 into position where the article contained in the pocket will pass therefrom and be delivered into the receiver 127, where it can be reached by the purchaser. The parts will continue to operate automatically with each deposit of a coin until the power-spring has unwound to its limit or to a point where it does not have sufficient force to start the actuating mechanism, at which time the power-spring must be rewound, placing the vending-machine again in operative condition. The delivery of an article having a price corresponding to the value of a single deposited coin is attained with the bridge-pieces all down, as shown in Fig. 9. The delivery of two articles for the value of a single coin deposited is attained by setting the bridge-pieces so that each alternate space or recess will be covered or bridged, and with the deposit of the coin the stop 89 will ride over the projection 92 and over the next succeeding bridge-piece, revolving the carrier or delivery cylinder a distance sufficient to bring two pockets into position for discharging each its contents to enter the receiver at the front of the machine to be taken by the purchaser. The delivery of three articles with the deposit of a single coin is attained by raising one-half of the bridge-pieces so as to cover or bridge two succeeding spaces or recesses, which maintains the stop 89 raised for the carrier or delivery cylinder to rotate a distance to bring three pockets 123 into discharging position, successively delivering into the receiver 127 three articles with the deposit of each coin. The delivery of an article of double the price of the deposited coin is attained by setting the stop pin or stem 28 in the second hole from the top, which brings the stop pin or stem in position where two coins of the same value will be required to be deposited in order to force inwardly the spring 48 and release the fan to start the actuating mechanism. The bridge-pieces for delivering an article with the deposit of two coins are set so as to leave all of the recesses or spaces 91 open, for the stop 89 to enter each succeeding recess after passing over the preceding bridge-piece and projection, as described, for the operation in delivering an article for a single coin, an article being delivered as the carrier or delivery cylinder is rotated forward so as to bring a pocket into position for discharging. The delivering of a single article of a price equal to three times the value of a single coin is attained by setting the stop pin or stem 28 in the third hole from the top, which requires three coins to be deposited in order for the last-deposited coin to act on the spring 48 and release the fan and its stop-pin, and with the release of the fan the power-spring acts and the delivery of a single article is accomplished in the same manner as described for the delivery of a single article with the deposit of a single coin. The delivery of a single article of a price equal to four times the value of a single coin is attained by setting the stop-pin 28 in the fourth hole from the top, which requires four coins to be deposited in order for the last coin dropped to engage the spring 48 and release the fan, and with the release of the fan the power-spring acts and operates the parts as described for delivering an article with a deposit of a single coin. The delivery of a single article of a price equal to the value of five coins is attained by removing the stop pin or stem 28 entirely, so that it will require five coins to be deposited in order for the last coin dropped to engage the spring 48 and release the fan to start the actuating mechanism and deliver an article as described for the operation of the machine in delivering a single article with the deposit of a single coin. It will be understood that with the start of the actuating mechanism whether one, two, three, four, or five coins be deposited the plate 21 is moved away from the coin-chute, so as to withdraw the stop pins or stems and allow the collected coins to descend and pass out from the coin-chute. The plate 21 is moved away from the coin-chute to withdraw the stop pins or stems through the medium of the swinging arm or rod 73 when a coin is in position to press the spring 48 to move the shaft 50 inwardly. The spring is pressed to move the shaft by the stoppage of the coin at a point where the full periphery of the coin will act— one edge of the periphery against the wall of the chute and the other edge against the face of the spring. The action of the coin can only take place when a coin is fully stopped in its descent to laterally force the spring away from the coin-chute, and for this reason where two or more coins are required to start the actuating mechanism the last coin deposited will be the operative one, as the coin first deposited will simply pass the spring without holding the spring in its advanced position a sufficient length of time to move the shaft 50 inwardly to release the fan, all the coins except the last one simply passing through the chute and resting on the lowermost stop-pin.

The mechanism as a whole is adapted for the sale of articles having different values, the value being some ratio of a deposited coin, and in making the sale no change in the mechanism is required except the setting of the first stop pin or stem 28 in the required hole for the number of coins to be deposited in order to move the spring 48 and release the fan. The operation of the mechanism after the power-spring is wound is entirely automatic, depending on the deposit of the required number of coins and inoperative until the required number of coins have been deposited, thus enabling articles of varying value to be sold without any change in the construction of the mechanism.

The articles to be sold should be of a nature to enable a single article to be deposited in a pocket, and it will be understood that the shape of the pocket can be varied to suit the shape of the article, so long as the pocket is of a form to discharge but a single article with the deposit of the required number of coins. The start of the actuating mechanism is dependent on the release of the fan, for which purpose the shaft of the fan is endwise movable, and the release of the fan can only be attained with the deposit of the required number of coins for the last coin deposited to engage the spring 48 and move the shaft 50 endwise, so as to release the fan. The control of the delivery of the articles is dependent on the position of the bridge-pieces for the stop disk or plate, and these bridge-pieces can be readily and quickly changed as to their position, so as to have the rotatable carrier or delivery cylinder advanced the distance required to discharge an article when the price of the article has been deposited in the coin-chute. The release of the deposited coins and the discharging of an article are both controlled through the revolving of the stop disk or plate and the position of the bridge-pieces, so that when the stop-arm has entered an open recess or space assurance is had that the deposited coins have been discharged from the chute and the parts will return to their normal position and be in a set condition for the next operation with the deposit of the coin or coins.

What I claim as new, and desire to secure by Letters Patent, is—

1. In an automatic vending-machine, the combination of a coin-chute having an opening on one edge for the projection of the edge of a coin, a movable shaft, a fan on the movable shaft, a stop engaging with the fan when the fan is in normal position, a train of gear spring-actuated and controlled by the fan, and means connecting the end of the movable shaft with a deposited coin for disengaging the fan and starting the train of gear, substantially as described.

2. In an automatic vending-machine, the combination of a coin-chute having an opening on one edge for the projection of the edge of a coin, a movable shaft, a fan on the movable shaft, a stop engaging with the fan when the fan is in normal position, a train of gear spring-actuated and controlled by the fan, and a spring extending into the opening in the edge of the coin-chute and engaged with the end of the movable shaft for a deposited coin to contact the spring and move the shaft to disengage the fan and start the train of gear, substantially as described.

3. In an automatic vending-machine, the combination of a coin-chute, a swinging plate adjacent to the coin-chute on one side and having stop-pins to enter holes in the coin-chute and support a coin in operating position, one of said stop-pins having a constant fixed relation on the swinging plate and the other stop-pin being removably connected with the swinging plate, and means actuated from the positioned coin for moving the swinging plate away from the coin-chute to remove the stop-pins and allow the coin to discharge from the chute and moving the swinging plate toward the coin-chute to restore the stop-pins for use in the next operation of the machine, substantially as described.

4. In an automatic vending-machine, the combination of a coin-chute, a swinging plate adjacent to the coin-chute on one side and having stop-pins to enter holes in the coin-chute and support a coin in operating position, one of said stop-pins having a constant fixed relation on the swinging plate and the other stop-pin being removably connected with the swinging plate, a link pivotally connected with the lower end of the swinging plate, an oscillating rod connected with the link, a rocking head carrying the oscillating head, and means for rocking the head, substantially as described.

5. In an automatic vending-machine, the combination of a coin-chute, a swinging plate adjacent to the coin-chute on one side and having stop-pins to enter holes in the coin-chute and support a coin in operating position, one of said stop-pins having a constant fixed relation on the swinging plate and the other stop-pin being removably connected with the lower end of the swinging plate, an oscillating rod connected with the link, a rocking head carrying the oscillating head, means for rocking the head, a slide connected with the oscillating rod, and a hook carried by the slide, substantially as described.

6. In an automatic vending-machine, the combination of a coin-chute having an opening on one edge for the projection of the edge of a coin, a movable shaft, a fan on the movable shaft, a stop engaging with the fan, a train of gear controlled by the fan, a spring extending into the opening of the coin-chute and engaging with the end of the movable shaft and engaged by a dropped coin, a swinging plate adjacent to the coin-chute, stop-pins on the swinging plate and projecting into the space of the coin-chute when the parts are normal, and means for moving the plate away from the coin-chute to remove the stop-pins and permit a deposited coin to drop down the chute after releasing the fan and starting the train of gear, substantially as described.

7. In an automatic vending-machine, the combination of a coin-chute having an opening on one edge for the projection of the edge of a coin, a movable shaft, a fan on the movable shaft, a stop engaging with the fan, a train of gear controlled by the fan, a spring extending into the opening of the coin-chute and engaging with the end of the movable shaft and engaged by a dropped coin, a swinging plate adjacent to the coin-chute, stop-pins on the swinging plate and projecting into the space of the coin-chute when the parts are normal, a link connected with the swinging plate, an oscillating arm connected with the link, a rocking head, and means for rocking the head to move the oscillating arm, and swing the plate away from the coin-chute to remove the stop-pins and permit a deposited coin to drop down the chute after releasing the fan and starting the train of gear, substantially as described.

8. In an automatic vending-machine, the combination of a coin-chute having an opening on one edge for the projection of the edge of a coin, a movable shaft, a fan on the movable shaft, a stop engaging with the fan, a train of gear controlled by the fan, a spring extending into the opening of the coin-chute and engaging with the end of the movable shaft and engaged by a dropped coin, a swinging plate adjacent to the coin-chute, stop-pins on the swinging plate and projecting into the space of the coin-chute when the parts are normal, a link connected with the swinging plate, an oscillating arm connected with the link, a rocking head, a rod connected with the rocking head and having a stop on its free end, a recessed disk engaging with the stop of the rod, bridges on the disk for closing the recesses, a shaft on which the disk is mounted, and a gear on the shaft driven from the train of gear controlled by the fan, substantially as described.

9. In an automatic vending-machine, the combination of a coin-chute having an opening on one edge for the projection of the edge of a coin, a movable shaft, a fan on the movable shaft, a stop engaging with the fan, a train of gear controlled by the fan, a spring extending into the opening of the coin-chute and engaging with the end of the movable shaft and engaged by a dropped coin, a swinging plate adjacent to the coin-chute, stop-pins on the swinging plate and projecting into the space of the coin-chute when the parts are normal, a link connected with the swinging plate, an oscillating arm connected with the link, a rocking head, a rod connected with the rocking head and having a stop on its free end, a recessed disk engaging with the stop of the rod, bridges on the disk for closing the recesses, a shaft on which the disk is mounted, a gear on the shaft driven from the train of gear controlled by the fan, a carrier or delivery cylinder having peripheral pockets and mounted on the shaft of the disk, a receptacle for articles to be sold arranged in juxtarelation to the carrier or delivery cylinder, and a receiver for an article discharged from the carrier or delivery cylinder, substantially as described.

10. In an automatic vending-machine, the combination of a coin-chute having an opening on one edge for the projection of the edge of a coin, a movable shaft having its end engaged by the projected edge of a coin in the chute, a fan on the movable shaft, a stop engaging with the fan when the fan is in normal position, a train of gear controlled by the fan, a swinging plate carrying stop-pins projecting into the coin-chute and regulating the position of the coins dropped into the chute, a rocking head, a connection between the rocking head and the swinging plate, a return-spring for the rocking head, a recessed disk, a connection between the recessed disk and the rocking head, a series of bridges on the disk controlling the recesses of the disk, a shaft on which the recessed disk is mounted, and a gear on the shaft driven from the train of gear controlled by the fan, substantially as described.

11. In an automatic vending-machine, the combination of a rocking head, an oscillating arm entered into one end of the rocking head, a swinging plate carrying stop-pins for deposited coins and connected with the oscillating rod, a rod entered into the opposite end of the rocking head, a recessed disk with which the end of the last-named arm contacts, bridges on the disk controlling the recesses of the disk, a shaft on which the recessed disk is mounted, a gear on the shaft, a train of gear controlled by a fan, a movable fan actuated by the deposit of a coin, a carrier or delivery cylinder having peripheral pockets and mounted on the shaft of the disk, a receptacle for articles arranged to deliver the articles to the carrier or delivery cylinder, and a receiver into which the articles are discharged from the carrier or delivery cylinder, substantially as described.

12. In an automatic vending-machine, the combination of a coin-chute having an opening on one edge for the projection of the edge of a coin, an endwise-movable shaft, a fan on the shaft controlling a train of gear, a stop engaged by the fan, a swinging plate, mounted on the coin-chute, and carrying stop-pins for entering the coin-chute and retaining the dropped coin in position to endwise move the fan of the shaft, and means for swinging the plate, substantially as described.

13. In an automatic vending-machine, the combination of a rocking head, a rod depending from one end of the rocking head, a connection between the lower end of the rod and a swinging plate carrying stop-pins for locating the position of dropped coins in a coin-chute, a rod carried by the other end of the rocking head and having a stop end, and a revoluble recessed disk for controlling the movements of the rocking head, substantially as described.

14. In an automatic vending-machine, the combination of a rocking head, a rod depending from one end of the rocking head, a connection between the lower end of the rod and a swinging plate carrying stop-pins for locating the position of dropped coins in a coin-chute, a rod carried by the other end of the rocking head and having a stop end, and a revoluble recessed disk having a bridge for each recess for controlling the movement of the rocking head, substantially as described.

15. In an automatic vending-machine, the combination of an endwise-movable shaft, a fan on the movable shaft controlling a clock-movement, a spring engaging one end of the shaft for moving the shaft endwise with the deposit of a coin, a spring engaging the opposite end of the shaft for returning the shaft and fan to normal position, and a stop for the fan when in normal position, substantially as described.

16. In an automatic vending-machine, the combination of an endwise-movable shaft, a fan on the movable shaft controlling a clock-movement, a spring engaging one end of the shaft for moving the shaft endwise with the deposit of a coin, a spring engaging the opposite end of the shaft for returning the shaft and fan to normal position, a weighted arm engaging the return-spring for the shaft, and a stop for the fan when in normal position, substantially as described.

FRANK JANATA.

Witnesses:
WALKER BANNING,
WILLIAM P. BOND.